US008502055B2

(12) United States Patent
Delorme

(10) Patent No.: US 8,502,055 B2
(45) Date of Patent: Aug. 6, 2013

(54) METHOD AND SYSTEM FOR PRESENTING A MUSICAL INSTRUMENT

(75) Inventor: David Brux Delorme, Stone Mountain, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 57 days.

(21) Appl. No.: 13/025,215

(22) Filed: Feb. 11, 2011

(65) Prior Publication Data

US 2011/0130204 A1 Jun. 2, 2011

Related U.S. Application Data

(62) Division of application No. 12/436,084, filed on May 5, 2009, now Pat. No. 7,906,720.

(51) Int. Cl.
*G09B 15/00* (2006.01)
*G09B 15/02* (2006.01)
*G10H 1/00* (2006.01)

(52) U.S. Cl.
USPC ............. 84/477 R; 84/485 R; 84/615; 84/653

(58) Field of Classification Search
None
See application file for complete search history.

(56) References Cited

U.S. PATENT DOCUMENTS

| | | | | |
|---|---|---|---|---|
| 3,403,591 | A | 10/1968 | Weitzner | |
| 3,897,711 | A | 8/1975 | Elledge | |
| 3,978,757 | A | 9/1976 | Johnson, Jr. | |
| 5,266,735 | A | 11/1993 | Shaffer | |
| 5,400,687 | A * | 3/1995 | Ishii | 84/477 R |
| 5,461,616 | A | 10/1995 | Suzuki | |
| 5,574,964 | A | 11/1996 | Hamlin | |
| 5,690,496 | A | 11/1997 | Kennedy | |
| 5,855,483 | A | 1/1999 | Collins | |
| 6,063,994 | A | 5/2000 | Kew | |
| 6,162,981 | A | 12/2000 | Newcomer | |
| 6,225,547 | B1 | 5/2001 | Toyama | |
| 6,526,424 | B2 * | 2/2003 | Kanno et al. | 715/229 |
| 6,541,688 | B2 | 4/2003 | Asahi | |
| 6,574,625 | B1 * | 6/2003 | Bates et al. | 707/749 |
| 6,702,677 | B1 | 3/2004 | Fujisawa | |
| 6,740,802 | B1 * | 5/2004 | Browne, Jr. | 84/609 |
| 6,982,375 | B2 * | 1/2006 | McGregor | 84/478 |
| 7,098,392 | B2 * | 8/2006 | Sitrick et al. | 84/477 R |
| 7,151,214 | B2 | 12/2006 | Barry | |

(Continued)

OTHER PUBLICATIONS

Guitar Hero, pp. 1-3, http://hub.guitarhero.com/; website last visited May 5, 2009.

(Continued)

*Primary Examiner* — Marlo Fletcher
(74) *Attorney, Agent, or Firm* — Guntin & Gust, PLC; Douglas Schnabel

(57) ABSTRACT

A system that incorporates teachings of the present disclosure may include, for example, a method for presenting a first portion of the simulated musical instrument on a first presentation device, presenting a second portion of the simulated musical instrument on a second presentation device, presenting at the first presentation device a demonstrative stimulus directed to the first portion, and further presenting at least a portion of the musical score with an indicator providing instruction for stimulating the second portion according to the portion of the musical score where the indicator is located, detecting a stimulus directed to the second portion, and presenting an audible sound corresponding to the demonstrative stimulus directed to the first portion and the stimulus directed to the second portion. Other embodiments are disclosed.

17 Claims, 6 Drawing Sheets

U.S. PATENT DOCUMENTS

| | | | | |
|---|---|---|---|---|
| 7,164,076 | B2 | 1/2007 | McHale | |
| 7,223,913 | B2 | 5/2007 | Knapp | |
| 7,323,633 | B2 | 1/2008 | Shaffer | |
| 7,378,585 | B2 * | 5/2008 | McGregor | 84/600 |
| 7,402,746 | B2 | 7/2008 | Saenz | |
| 7,423,213 | B2 | 9/2008 | Sitrick | |
| 7,446,253 | B2 | 11/2008 | Knapp | |
| 7,459,624 | B2 | 12/2008 | Schmidt | |
| 7,462,772 | B2 | 12/2008 | Salter | |
| 7,521,619 | B2 | 4/2009 | Salter | |
| 7,563,973 | B2 | 7/2009 | Koseki | |
| 7,563,974 | B2 | 7/2009 | Ozaki | |
| 7,714,220 | B2 * | 5/2010 | Festejo | 84/485 R |
| 7,772,480 | B2 * | 8/2010 | Brennan | 84/615 |
| 7,777,117 | B2 | 8/2010 | Salter | |
| 7,906,720 | B2 * | 3/2011 | Delorme | 84/477 R |
| 7,910,818 | B2 * | 3/2011 | Kim et al. | 84/477 R |
| 7,968,783 | B2 * | 6/2011 | Oshiyama et al. | 84/609 |
| 8,134,061 | B2 * | 3/2012 | Feeney et al. | 84/477 R |
| 8,138,409 | B2 * | 3/2012 | Brennan | 84/616 |
| 8,158,869 | B2 * | 4/2012 | Charles | 84/477 R |
| 2004/0127268 | A1 | 7/2004 | Wong | |
| 2006/0160623 | A1 | 7/2006 | Lee | |
| 2006/0191399 | A1 | 8/2006 | Miyaki | |
| 2006/0196343 | A1 | 9/2006 | Yung | |
| 2007/0142077 | A1 | 6/2007 | Huang | |
| 2007/0163427 | A1 | 7/2007 | Rigopulos | |
| 2007/0243915 | A1 | 10/2007 | Egozy | |
| 2007/0245881 | A1 | 10/2007 | Egozy | |
| 2008/0060504 | A1 * | 3/2008 | Oshiyama et al. | 84/609 |
| 2009/0038467 | A1 * | 2/2009 | Brennan | 84/609 |
| 2009/0038468 | A1 * | 2/2009 | Brennan | 84/609 |
| 2009/0100988 | A1 | 4/2009 | Villa | |
| 2009/0227284 | A1 | 9/2009 | Jones | |
| 2009/0235808 | A1 | 9/2009 | Salter | |
| 2009/0260508 | A1 | 10/2009 | Elion | |
| 2009/0303231 | A1 | 12/2009 | Robinet | |
| 2010/0011938 | A1 * | 1/2010 | Adams | 84/470 R |
| 2010/0016059 | A1 | 1/2010 | Sims | |
| 2010/0018382 | A1 * | 1/2010 | Feeney et al. | 84/615 |
| 2010/0041480 | A1 | 2/2010 | Wong | |
| 2010/0095828 | A1 * | 4/2010 | Adams | 84/470 R |
| 2010/0162875 | A1 * | 7/2010 | Charles | 84/477 R |
| 2010/0307321 | A1 * | 12/2010 | Mann et al. | 84/613 |
| 2010/0319517 | A1 * | 12/2010 | Savo et al. | 84/609 |
| 2011/0185880 | A1 * | 8/2011 | Charles | 84/477 R |
| 2012/0132057 | A1 * | 5/2012 | Kristensen | 84/650 |

OTHER PUBLICATIONS iPhone User Guide, Use your iPhone as a Mouse and Keyboard, Oct. 20, 2008, viewed May 20, 2010 at http://www.iphoneuserguide.com/apple/2008/1 0/20/iphone3g/use-your-iphone-as-a-mouse-and-keyboard-for-your-mac-or-pc/.

Virtual Guitar, Flash based program for making a virtual guitar on a PC display controllable by a pointer, viewed Feb. 2, 2010 at http://virtualguitar.net!.

Pocket Guitar, released Jan. 19, 2008, turns the iPhone and iPod touch into a virtual guitar, viewed at http://code.google.com/p/pocketguitar/ on May 19, 2010.

Pocket Guitar Jan. 22, 2008, PocketGuitar—Play Virtual Guitar with iPhone or iPod Touch viewed at http://www.multicellphone.com/pocketguitar-play-virtual-guitar-with-iphone-or-ipod-touch/ on Feb. 2, 2010.

* cited by examiner

100

SHO
111
SHS
110
130
ISP Network 132
VHO 1
VHO 2
VHO 3
VHO 4
VHO 5
VHO 6
112
114
VHS
118
ACCESS NETWORK
117
115
119
Satellite dish receiver 131
108
STB 106
G 104
Ctrl 107
ISP Ntwk 132
STB 106
Cable TV 133
102
108
116
Remote Services

200

300

400

500

METHOD AND SYSTEM FOR PRESENTING A MUSICAL INSTRUMENT

CROSS REFERENCE TO RELATED APPLICATIONS

This application is a Divisional of U.S. patent application Ser. No. 12/436,084 filed May 5, 2009 by David Brux Delorme, entitled "METHOD AND SYSTEM FOR PRESENTING A MUSICAL INSTRUMENT", which is incorporated herein by reference in its entirety.

FIELD OF THE DISCLOSURE

The present disclosure relates generally to simulation of musical instruments and more specifically to a method and system for presenting a musical instrument.

BACKGROUND

Musical gaming applications generally operate from a gaming console which can be controlled with a specialized gaming controller having a form factor of a musical instrument (such as drums or an electric guitar) to provide a more realistic experience to gamers. The specialized gaming controller typically has controls that differ from an actual musical instrument. The musical gaming application generally presents musical prompts on a display to guide the gamer to manage the specialized gaming controller according to a given sequence which when followed causes musical sounds (percussions, guitar notes, etc.) that are combined with background music and video simulations.

DETAILED DESCRIPTION

One embodiment of the present disclosure can entail a communication device having a memory coupled to a controller. The controller can be operable to present a first portion of a simulated stringed instrument via a display of the communication device while a presentation device presents a second portion of the simulated stringed instrument with a demonstrative stimulus directed to the second portion, and further presents at least a portion of a musical score with an indicator of a first location in the score to direct a user of the communication device to stimulate the first portion in accordance with the score at the first location. The controller can be further operable to receive a stimulus directed to the first portion of the simulated stringed instrument, and to submit the stimulus to a media processor communicatively coupled to the presentation device to cause the media processor to generate a sound corresponding to a combination of the stimulus directed to the first portion and the demonstrable stimulus directed to the second portion, and to update the demonstrative stimulus presented at the presentation device according to a new location of the indicator at a second location in the musical score.

An embodiment of the present disclosure can entail a method for presenting a first portion of the simulated musical instrument on a first presentation device, presenting a second portion of the simulated musical instrument on a second presentation device, presenting at the first presentation device a demonstrative stimulus directed to the first portion, and further presenting at least a portion of the musical score with an indicator providing instruction for stimulating the second portion according to the portion of the musical score where the indicator is located, detecting a stimulus directed to the second portion, and presenting an audible sound corresponding to the demonstrative stimulus directed to the first portion and the stimulus directed to the second portion.

An embodiment of the present disclosure can entail a computer-readable storage medium having computer instructions to present a first portion of a simulated stringed instrument on a first presentation device while a second presentation device presents a second portion of the simulated stringed instrument with a demonstrative stimulus directed to the second portion, and further present at least a portion of the musical score with an indicator for providing instructions to stimulate the first portion. The computer-readable storage medium can further have computer instructions to submit to the second presentation device a stimulus directed to the first portion to cause the second presentation device to generate a sound corresponding to a combination of the stimulus directed to the first portion and the demonstrable stimulus directed to the second portion.

Figure 1:
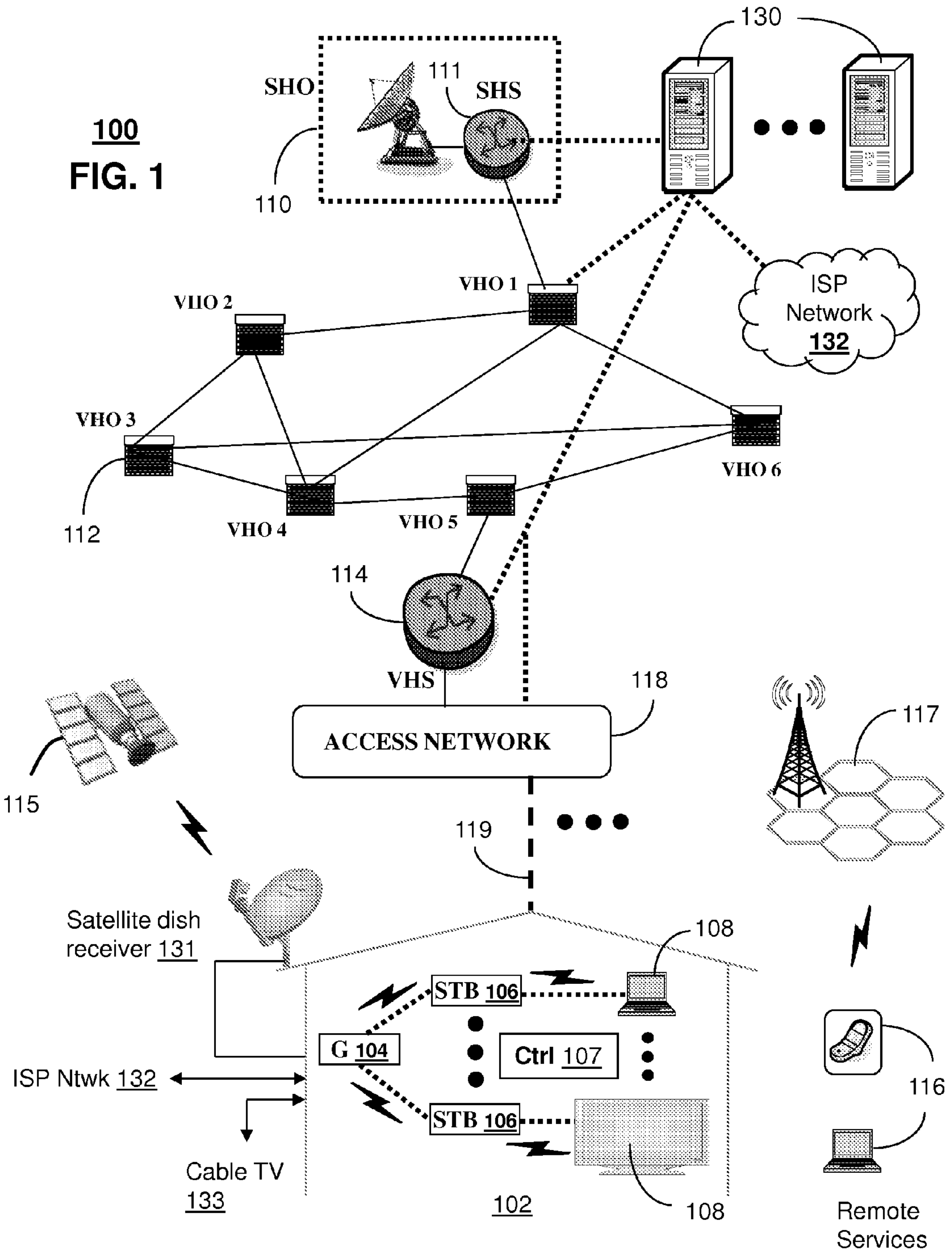
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
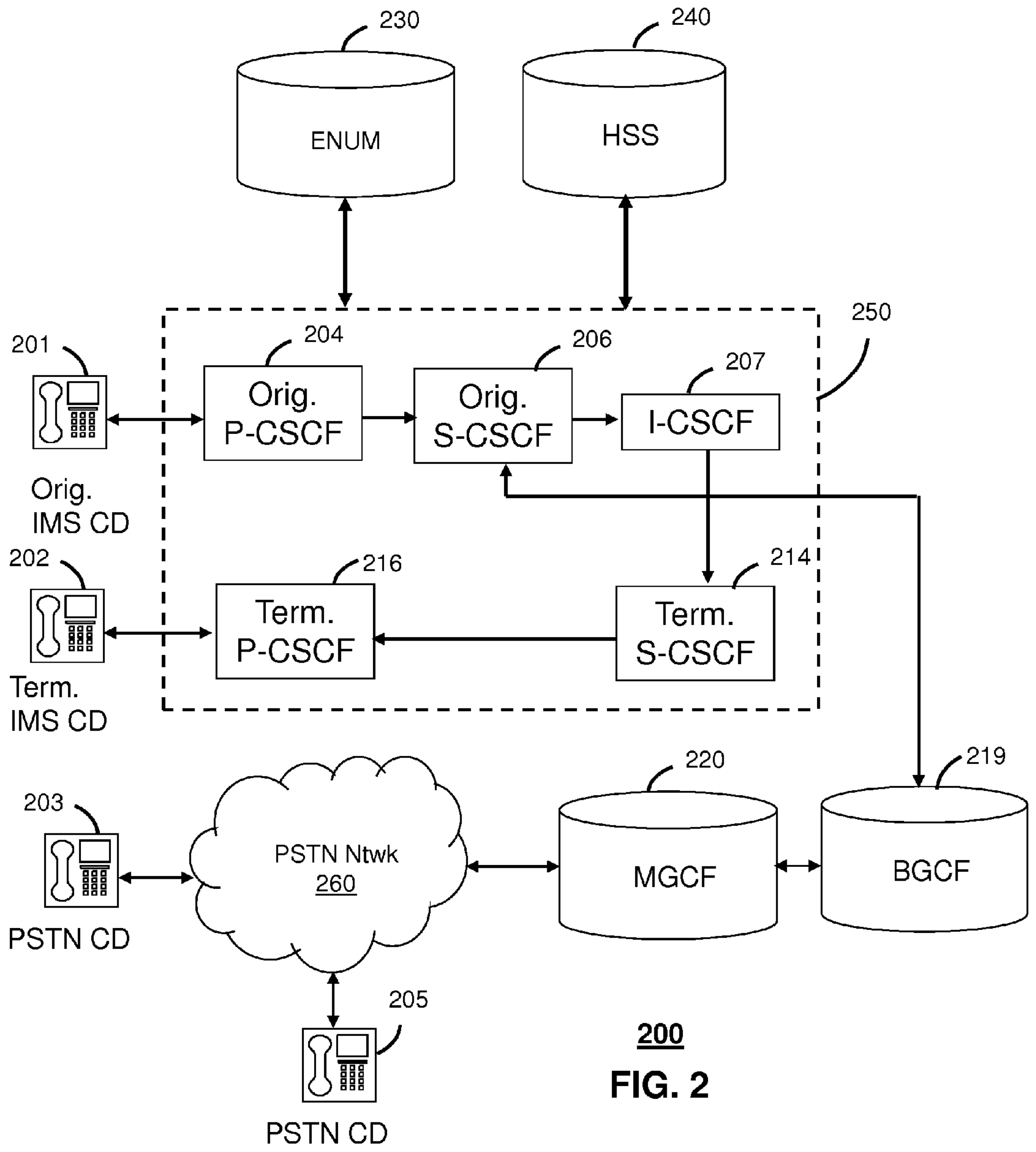

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. Any communication session involving at least one PSTN CD requires the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 the multimedia and Internet services of communication system 100.

Figure 3:
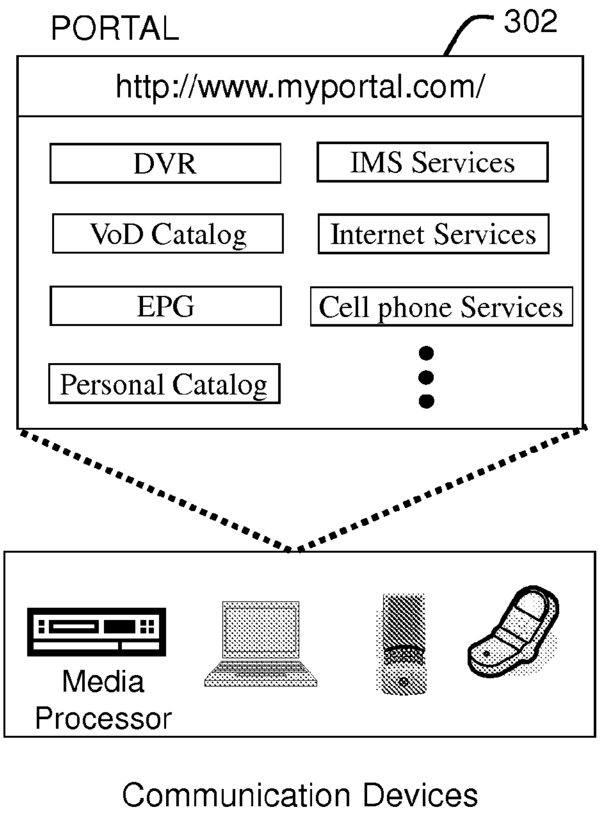
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
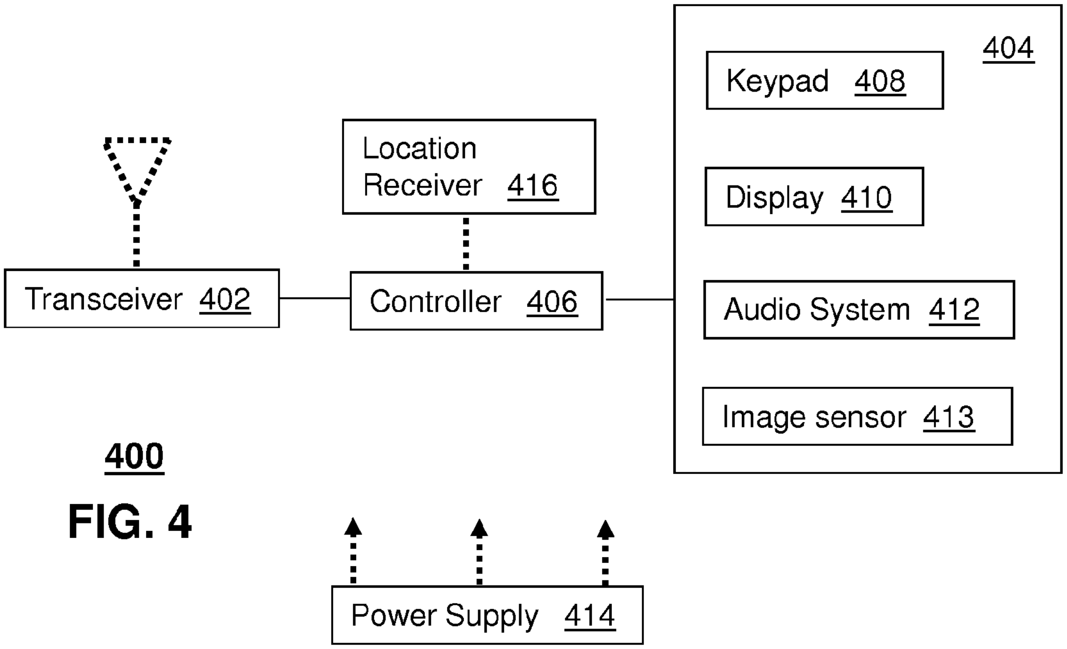
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
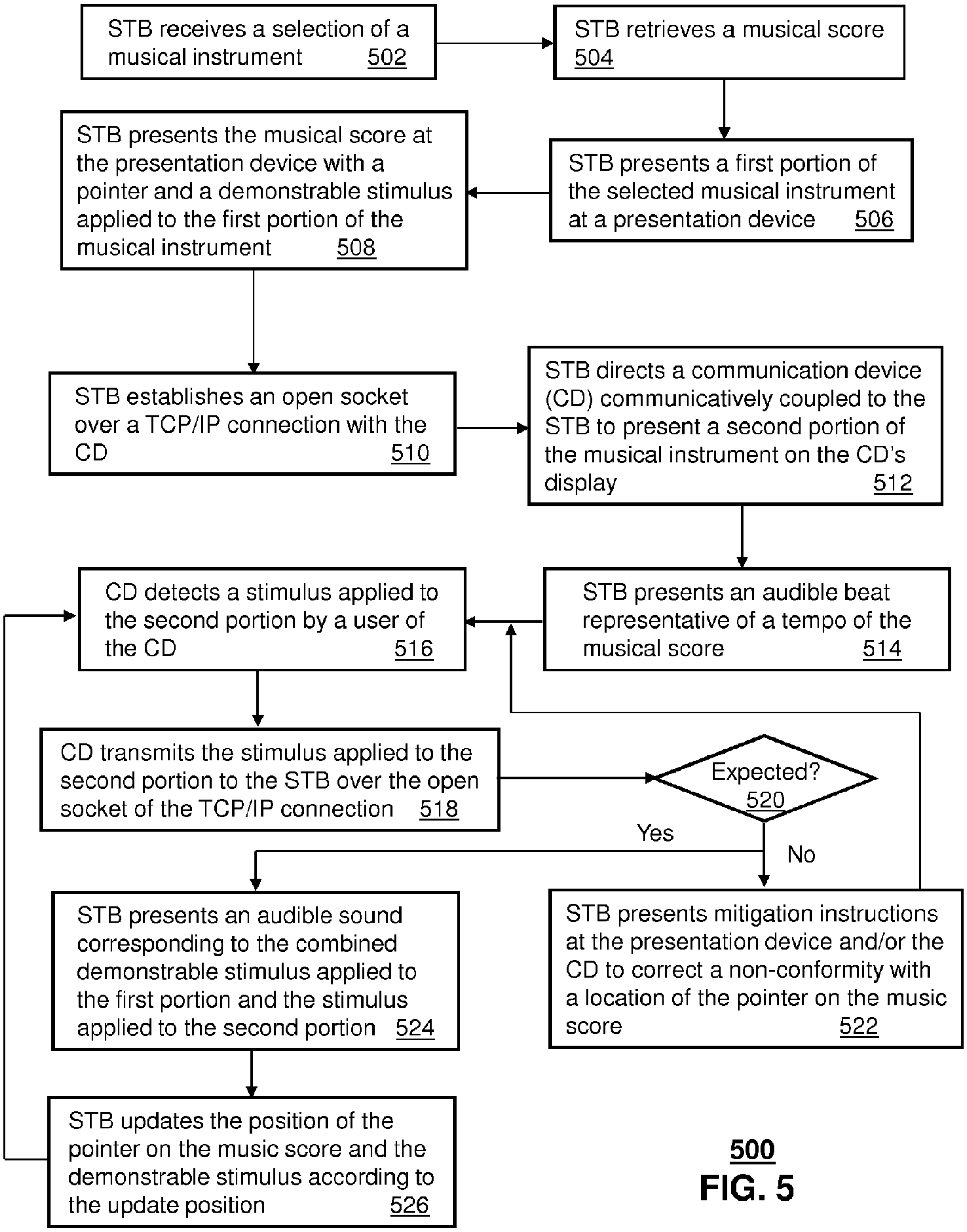
FIG. 5 depicts an illustrative embodiment of a method operating in portions of the communication systems of FIGS. 1-2.
Figure 6:
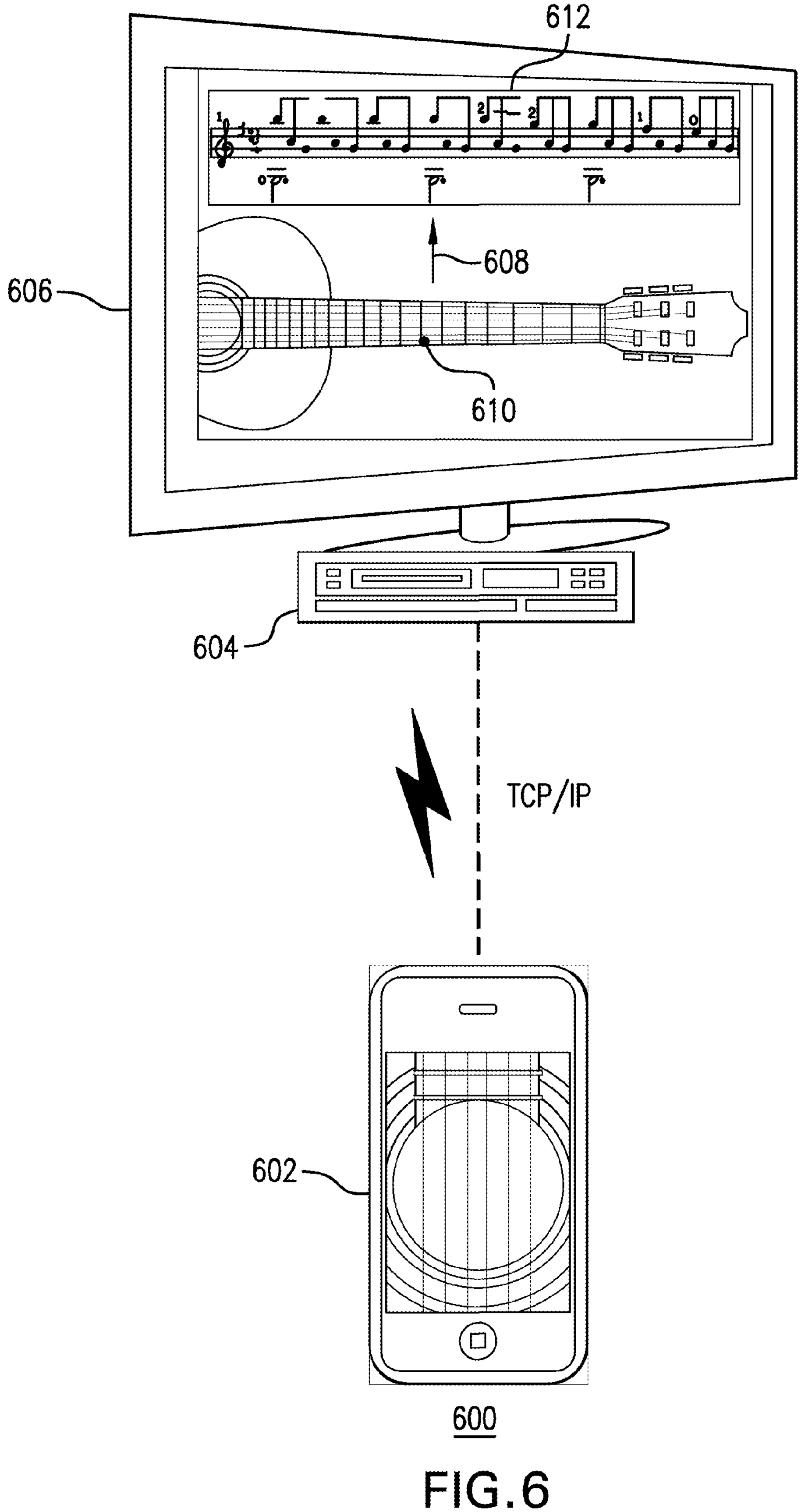
FIG. 6 depicts an illustrative embodiment of a communication system operating according to the method of FIG. 5.

FIG. 5 depicts an illustrative method 500 that operates in portions of the communication system of FIG. 1. FIG. 6 illustrates a communication system depicting portions of FIG. 1 to aid in describing method 500. Method 500 can begin with step 502 in which an STB 604 as shown in FIG. 6 receives a selection of a musical instrument. This step can represent the STB 604 presenting on a presentation device such as a television unit 606 a menu of selectable musical instruments. The menu can consist of any number of stringed musical instruments such as a classical guitar, an electric guitar, a violin, a cello, a viola, a bass, a mandolin, a banjo, and so on. Other musical instruments are contemplated by the present disclosure. Using a remote control such as control 107 of FIG. 1, the user can select a musical instrument of interest. In the present illustration the remote control 107 can be represented by a communication device such as a WiFi-enabled device. The WiFi-enabled device can be a media player (e.g., an iPOD Touch™) or a cellular phone (e.g., an iPhone™) For illustration purposes, the communication device of FIG. 6 will be referred to as cellular phone 602 having a touch-sensitive display. Other communication devices are contemplated by the present disclosure.

The cellular phone 602 can be communicatively coupled to the STB 6504 over a wireless interface such as a WiFi communication link providing an open socket of a transmission control protocol/Internet Protocol (TCP/IP) connection therebetween. Once a musical instrument selection is made, the user of the cellular phone 602 can also be presented a number of musical scores that can be categorized from novice to expert scores. In the same manner that an instrument can be selected from a common drop-down GUI menu presented on the TV unit 606, the user can select a desired musical score from a similar drop-down GUI menu. Once the score is selected, the STB 604 can be programmed to retrieve the musical score from a library (e.g., a database) that can be stored in the STB 604 or remotely stored in a network element of an the interactive TV (iTV) network such as was described in FIG. 1. The musical score can be described with extensible markup language (XML) or another suitable format. The STB 604 can process the musical score in the XML format utilizing a common web application operating therein.

Once the musical instrument and musical score have been selected, the STB 604 can proceed to step 506 where it can present a first portion of the selected musical instrument at the TV unit 606. In this illustration, the musical instrument is depicted as a classical guitar. In step 508 the STB 604 can also present a portion of the musical score 612 at the TV unit 606 with a pointer 608 pointing to a portion of the musical score to describe a type of stimulus to be applied to the musical instrument. Additionally, the STB 604 presents a demonstrable stimulus 610 in the form of a dot to indicate which string (or strings) of a fret board of the classical guitar is/are depressed. In step 510 the STB 604 establishes an open socket TCP/IP connection with the cellular phone 603 unless it has been established previously.

In step 512, the STB 604 can direct the cellular phone 602 to present a second portion of the classical guitar on the touch-display. The second portion in this illustration is the sound hole with strings of the classical guitar. By touching or stroking the display of the cellular phone 602, the user can simulate an application of a stimulus to the second portion. In step 514 the STB 604 can present an audible beat representative of a tempo of the musical score. The audible beat can be presented by a surround sound system coupled to the STB 604, or speakers embedded in the TV unit 606 to aid the user in playing the simulated instrument. The audible beat can be produced by the STB 604 from a wave (.WAV) file supplied with the musical score.

In step 516 the cellular phone 602 can detect the user applying a stimulus to the second portion of the classical guitar by way of the touch-sensitive display. The stimulus can be a pluck or stroke of one or more strings. When such a detection occurs, the cellular phone 602 can proceed to step 518 where it transmits the detected stimulus applied to the second portion (in this illustration the sound hole of the guitar) to the STB 604. For efficient communications between the cellular phone 602 and the STB 604, the stimulus can be transmitted as XML command over the open socket of the TCP/IP connection. Alternatively, the stimulus can be transmitted as an HTTP command or another suitable protocol for exchanging messages. The stimulus can be described as string number(s) or another suitable coding scheme that can describe the stimulus applied by the user of the cellular phone 602.

The STB 604 can compare in step 520 the received stimulus with an expected stimulus to determine if the received stimulus conforms to the location of the pointer 608 on the musical score 612. The expected stimulus can be provided with the XML entries of the musical score. If the received stimulus and expected stimulus do not match, the STB 604 can proceed to step 522 where it presents mitigation instructions at the TV unit 606 and/or a portion of the touch-sensitive display of the cellular phone 602. For example, the mitigation instruction can be illustrative such as by highlighting the string (or strings) that should have been plucked or stroked on the display of the cellular phone 602. The highlighting can be performed by color coding the string(s), flashing the string(s), or by other suitable highlighting methods. The STB 604 can also present a simulated hand on the TV unit 606 that can illustrate how to apply the stimulus at the sound hole, or it can highlight the strings in a manner similar to what was described above.

If there is a mismatch, the STB 604 can proceed from step 522 to step 516 where it awaits another attempt by the user to create the proper stimulus. Once the proper stimulus is detected in step 520, the STB 604 can proceed to step 524 where it presents an audible sound corresponding to the combined demonstrable stimulus 610 applied by the STB 604 to the first portion of the guitar (fret board) and the stimulus applied by the user by way of the touch-sensitive display of the cellular phone 602 to the second portion of the guitar (sound hole). The audible sound can be presented by the STB 604 by processing a WAV file retrieved from a local database base of WAV files indexed according to the combined demonstrable stimulus 610 and the stimulus applied by the user on the sound hole.

Alternatively, the demonstrable stimulus applied to the fret board and the stimulus applied to the sound hole can be supplied to a common tone generator which can produce the audible sound associated with the combined stimuli. The stimuli can be pre-processed by the STB 604 into codes that can be interpreted by the tone generator for generating the audible sound. Once the audible sound has been played out on speakers of the TV unit 606 (or a surround sound system coupled to the STB 604), the STB 604 can proceed to step 526 where it updates the position of the pointer 608 (e.g., shifted to the next note) and the demonstrable stimulus 610 (red dot or dots repositioned on the fret board). These updates can be presented on the TV unit 606 so that the user can see the progress of the music being played. STB 604 can then proceed to step 516 where method 500 is repeated until the musical score is completed.

Upon reviewing the aforementioned embodiments, it would be evident to an artisan with ordinary skill in the art that said embodiments can be modified, reduced, or enhanced without departing from the scope and spirit of the claims described below. For example, the initial set up of the musical instrument simulation (e.g., steps 502 through 514) can be directed by the cellular phone 602 instead of the STB 604. In another embodiment, the cellular phone 602 and STB 604 can be replaced with other forms of media processors (e.g., PDA, personal computer, etc.). Consequently, method 500 can be applied between two cellular phones, whereby one phone presents a first portion of the instrument with a musical score, and a first portion of the instrument with a demonstrable stimulus, while the other phone presents the second portion of the instrument which can be stimulated by the user. Other combinations such as PDA to personal computer, media player to gaming console, are contemplated. Method 500 can also be adapted to operate with IMS communication devices described in FIG. 2.

Other suitable modifications can be applied to the present disclosure without departing from the scope of the claims below. Accordingly, the reader is directed to the claims section for a fuller understanding of the breadth and scope of the present disclosure.

Figure 7:
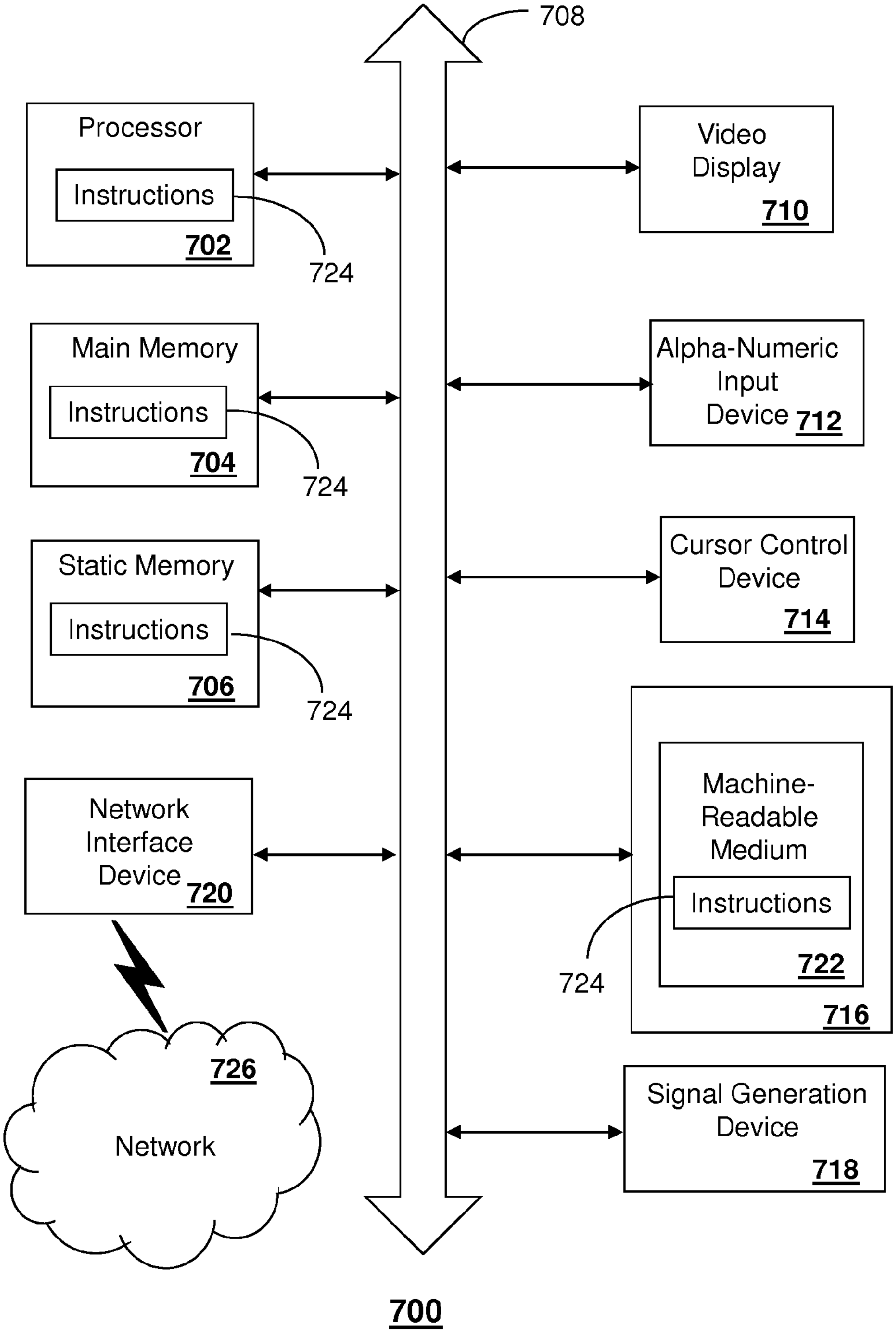
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:

a memory to store instructions; and a processor coupled to the memory, wherein the processor, responsive to executing the instructions, performs operations comprising:

presenting a first portion of a simulated stringed instrument via a display of the communication device, while a presentation device presents a second portion of the simulated stringed instrument with a demonstrative stimulus directed to the second portion and further presents a portion of a musical score with an indicator of a first location in the score to direct a user of the communication device to stimulate the first portion of the simulated stringed instrument in accordance with the score at the first location, wherein the display of the communication device comprises a touch-sensitive screen, wherein the presentation device comprises a television without a touch-sensitive screen;

receiving a stimulus directed to the first portion of the simulated stringed instrument; and submitting the stimulus to a media processor communicatively coupled to the presentation device to cause the media processor to generate a sound corresponding to a combination of the stimulus directed to the first portion and the demonstrable stimulus directed to the second portion; and to update the demonstrative stimulus presented at the presentation device so as to present the indicator at a second location in the musical score, wherein the media processor comprises a set-top box.

2. The communication device of claim 1, wherein the processor further performs operations comprising transmitting the stimulus over an open socket of a transmission control protocol/Internet Protocol connection between the communication device and the media processor.

3. The communication device of claim 1, wherein the processor further performs operations comprising receiving a mitigation instruction from the media processor to correct the stimulus responsive to the media processor detecting that the stimulus is inconsistent with an expected stimulus corresponding to the location of the indicator in the musical score.

4. The communication device of claim 1, wherein the simulated stringed instrument corresponds to one of a classical guitar, an electric guitar, a violin, a cello, a viola, a bass, a mandolin, or a banjo.

5. The communication device of claim 1, wherein the first portion of the simulated stringed instrument corresponds to a sound hole.

6. The communication device of claim 1, wherein the second portion of the simulated stringed instrument corresponds to a fret board.

7. A method, comprising:

presenting, by a system comprising a processor, a first portion of a simulated musical instrument on a first presentation device;

presenting, by the system, a demonstrative stimulus directed to the first portion at the first presentation device, and further presenting, by the system, a portion of a musical score with an indicator providing instruction for stimulating a second portion according to the portion of the musical score where the indicator is located;

detecting, by the system, a stimulus directed to a second portion of the simulated musical instrument that is being presented on a second presentation device;

retrieving, by the system, an audible sound from a library of sounds indexed according to a combination of the demonstrative stimulus and the stimulus that is detected; and presenting, by the system, the audible sound, an updated indicator to the musical score, and an updated demonstrative stimulus applied to the first portion at the first presentation device responsive to detecting the stimulus, wherein the system is a set-top box, and wherein the second portion of the simulated musical instrument is presented at the second presentation device by a mobile communication device.

8. The method of claim 7, comprising transmitting, by the system, the demonstrative stimulus that applied to the first portion and the stimulus that is directed to the second portion to generate the audible sound at a tone generator.

9. The method of claim 7, wherein the first portion of the simulated musical instrument corresponds to a fret board, and wherein the second portion of the simulated musical instrument corresponds to a sound hole.

10. The method of claim 7, wherein the simulated musical instrument corresponds to one of a classical guitar, an electric guitar, a violin, a cello, a viola, a bass, a mandolin, or a banjo.

11. The method of claim 7, wherein the simulated musical instrument corresponds to one of a classical) The method of claim 7, comprising processing the musical score according to an extensible markup language.

12. The method of claim 7, comprising establishing communications, by the system, between the first presentation device and the second presentation device according to a transmission control protocol session.

13. The method of claim 7, comprising:

detecting, by the system, that the stimulus does not conform with an expected stimulus determined from the location of the indicator on the musical score to identify a non-conformity; and providing, by the system, mitigation instruction to one of the first presentation device or the second presentation device for presentation to assist in correcting the non-conformity.

14. The method of claim 7, comprising presenting, by the system, an audible beat representative of a tempo of the musical score.

15. A tangible computer-readable storage medium, comprising instructions which, responsive to being executed by a processor, cause the processor to perform operations comprising:

presenting a first portion of a simulated stringed instrument on a first presentation device, while a second presentation device presents a second portion of the simulated stringed instrument with a demonstrative stimulus directed to the second portion, and further presenting a portion of a musical score with an indicator for providing instructions to stimulate the first portion, wherein the first presentation device comprises a television without a touch-sensitive screen and wherein the second presentation device comprises a non-touch-sensitive screen;

receiving a stimulus directed to the first portion of the simulated stringed instrument; and submitting to the second presentation device a stimulus directed to the first portion to cause the second presentation device to generate a sound corresponding to a combination of the stimulus directed to the first portion and the demonstrable stimulus directed to the second portion, wherein the indicator in the musical scored and the demonstrative stimulus are updated at the first presentation device.

16. The tangible computer-readable storage medium of claim 15, comprising instructions that cause the processor to further perform operations comprising receiving a mitigation instruction from the second presentation device to correct the stimulus responsive to the second presentation device detecting that the stimulus is inconsistent with an expected stimulus corresponding to a location of the indicator in the musical score.

17. The tangible computer-readable storage medium of claim 15, wherein the demonstrative stimulus presented at the presentation device is updated according to a new location of the indicator on the musical score.

* * * * *